(12) United States Patent
Hirose (10) Patent No.: US 12,397,452 B2
(45) Date of Patent: Aug. 26, 2025

(54) LONG ARM

(71) Applicant: HAKUSAN CORPORATION, Tokyo (JP)

(72) Inventor: Shigeo Hirose, Tokyo (JP)

(73) Assignee: HAKUSAN CORPORATION, Tokyo (JP)

( * ) Notice: Subject to any disclaimer, the term of this patent is extended or adjusted under 35 U.S.C. 154(b) by 0 days.

(21) Appl. No.: 18/005,956

(22) PCT Filed: Jul. 22, 2020

(86) PCT No.: PCT/JP2020/028572
§ 371 (c)(1),
(2) Date: Jan. 18, 2023

(87) PCT Pub. No.: WO2022/018874
PCT Pub. Date: Jan. 27, 2022

(65) Prior Publication Data
US 2023/0278238 A1    Sep. 7, 2023

(51) Int. Cl.
*B25J 18/02*    (2006.01)

(52) U.S. Cl.
CPC .................................... *B25J 18/02* (2013.01)

(58) Field of Classification Search
CPC ...... B66C 23/342; B66C 23/54; B25J 9/1045; B25J 9/104; B25J 9/023; B25J 9/0078; B25J 9/0021
(Continued)

(56) References Cited

U.S. PATENT DOCUMENTS 722,552 A * 3/1903 Anderson ............. B66C 23/342
                                                    182/63.1
3,534,867 A   10/1970 Johnston et al.
(Continued)

FOREIGN PATENT DOCUMENTS

JP    58-173683 U    11/1983
JP    H02-209394 A   8/1990
(Continued)

OTHER PUBLICATIONS

Japan Patent Office, Office Action issued Jun. 30, 2021, in Japanese Patent Application No. 2021-518212 (with English translation), 5 pages.
(Continued)

*Primary Examiner* — T. Scott Fix
(74) *Attorney, Agent, or Firm* — MASUVALLEY & PARTNERS; Peter Martinez (57) ABSTRACT

Provided is a long arm supported in a cantilever manner with light weight and high rigidity. The rod 30 is formed from rods 31-33 so as to be a multi-stage telescopic configuration. The rods 32, 33 respectively have upright columns 42, 43 on the tips. The wire 11 is suspended between the tip of the rod 31 and the lead end of the arm via the top of the column 42. The wire 12 is suspended between the base of the column 42 and the lead end of the arm via the top of the column 42. The wire 22 is suspended between the top of the column 42 and the lead end of the arm via the top of the column 43. The tension generation means 50 pulls the wires 10, 20. The air pressure generation means 60 applies pressure to the inside of the rod 30.

9 Claims, 7 Drawing Sheets

(58) Field of Classification Search
USPC .......................................................... 212/349
See application file for complete search history.

(56) References Cited

U.S. PATENT DOCUMENTS

| | | | | |
|---|---|---|---|---|
| 3,638,806 | A * | 2/1972 | Hippach | B66C 23/703 |
| | | | | 212/231 |
| 4,183,440 | A * | 1/1980 | Wilkinson | B66C 23/701 |
| | | | | 212/231 |
| 4,982,853 | A * | 1/1991 | Kishi | B66F 11/046 |
| | | | | 212/230 |
| 5,572,837 | A * | 11/1996 | Featherstone | B60Q 1/2657 |
| | | | | 52/118 |
| 5,813,552 | A * | 9/1998 | Kaspar | B66C 23/701 |
| | | | | 212/296 |
| 2004/0129663 | A1 * | 7/2004 | Willim | B66C 23/701 |
| | | | | 212/177 |
| 2009/0134107 | A1 * | 5/2009 | Doggett | B64G 4/00 |
| | | | | 212/239 |

FOREIGN PATENT DOCUMENTS

| | | |
|---|---|---|
| JP | H02-209395 A | 8/1990 |
| JP | H08-106811 A | 4/1996 |
| JP | 2003-089090 A | 3/2003 |
| WO | WO-8301407 A * | 4/1983 ............ B25J 18/025 |

OTHER PUBLICATIONS

WIPO, Japan International Search Authority, International Search Report (with English translation) and Written Opinion mailed Oct. 20, 2020, in International Patent Application No. PCT/JP2020/028572, 10 pages.

European Patent Office, Supplementary Extended European Search Report dated Mar. 28, 2024 in European Patent Application No. 20945716.7, 6 pages.

* cited by examiner

LONG ARM

RELATED APPLICATIONS

This application is the U.S. National Phase of and claims priority to International Patent Application No. PCT/JP2020/028572, International Filing Date Jul. 22, 2020, entitled Long Arm; which is incorporated herein by reference in its entirety.

TECHNICAL FIELD

The present invention relates to along arm which is supported in a cantilever manner under gravity.

BACKGROUND ART

When handling an object at a short distance, for example, a manipulator having a long arm or a robot arm is used (Patent Literature 1). In a case of making a long arm with high rigidity for supporting its own weight, the arm comes to have an increased cross section or comes to be heavy in weight.

For example, when performing a remote control under a severe condition, there may be such a case where a control of electric system becomes difficult due to heat, an electromagnetic field, radiation dose, humidity, high concentration-toxic chemical substances, etc., under the environment. Further, there may be also a case where the control may be limited because of restrictions due to a requirement performance for explosion proof, a spatial limit, and the like. On the other hand, many of the conventional robot arms for industrial use are made by using standard parts and include a plurality of actuators for improving an operation efficiency. In this case, the robot arms sometimes cannot be used under such severe conditions because of sizes or specifications of the arms.

CITATION LIST

Patent Literature

[PATENT LITERATURE 1]
JP 2003-89090A

SUMMARY OF INVENTION

Technical Problem

The invention of the present application was made in view of the above-described background. The present invention provides an arm capable of suitably performing a remote control under severe conditions.

Further, a purpose of the invention of the present application is to provide a long arm which is light in weight, has high rigidity, and addresses a high safety.

Solution to Problem

The present invention made to solve the above-described problem is directed to a long arm which is supported in a cantilever manner under gravity. The long arm includes rods for forming a long arm body, a plurality of upright columns standing from the rods, first wires stretched between a base section of the N−1$^{th}$ upright column from an arm top end side and the corresponding arm terminal ends via a top section of the N$^{th}$ upright column, second wires stretched between a top section of the N−1$^{th}$ upright column from the arm top end side and the corresponding arm terminal ends via the top section of the N$^{th}$ upright column, and tension generation means on the arm terminal end side for applying tension to the first wires and the second wires.

The tension of the first wires and the second wires on the arm top end side acts on to the arm on an arm terminal end side. The arm on the arm terminal end side is supported by the plurality of wires, which induces a coupled drive of wire. As a result, each of the wires can support the long arm with a relatively small traction force.

In the above-described invention, preferably, the rods have cross section areas which decrease from the arm terminal end side to the arm top end side.

In the above-described invention, preferably, the rods have cross section areas which decrease in a multistage manner from the arm terminal end side to the arm top end side. The plurality of upright columns is provided on stages of the rods in each corresponding manner.

In the above-described invention, preferably, the rods have an airtight property and receive a fluid pressure of a fluid supplied to the inside of the rods.

A rod shape and the internal pressure applied to the rods contribute to generation of an appropriate rod extension force that is to be generated by the fluid pressure at a posture of each of the upright columns of the rods. This enables to make the rods capable of supporting the long arm with the minimum rod weight.

In the above-described invention, preferably, the rods are formed in a multistage telescopic manner, i.e., the rods reduce their diameters from the arm terminal end side to the arm top end side. The rods formed into a multistage telescopic shape are extendable by the fluid pressure, and the plurality of upright columns is provided on stages of the rods in each corresponding manner.

The rods formed in a multistage telescopic manner are retractable, and thus are easy to carry in/out. Upon using, the rods extend out by the fluid pressure to form a rod.

In the above-described invention, preferably, the tension generation means can adjust the tension of the first wires and the second wires in accordance with the needed extension of the rods.

In the above-described invention, preferably, the tension generation means can adjust lengths of the first wires and the second wires in accordance with the needed extension of the rods.

The invention, preferably, includes third wires capable of controlling a feed and take-up speed, the third wires being stretched between the rods formed in a multistage telescopic manner and the corresponding arm terminal ends.

In the above-described invention, preferably, the third wires are provided to stages of the rods in each corresponding manner.

Accordingly, at the time of extending or at the time of retracting, the tension and the lengths of the first wires and the second wires can be adjusted.

Advantageous Effect of Invention

The long arm according to the invention of the present application is light in weight and has high rigidity. As a result, the invention addresses a safety. Further, the long arm according to the invention of the present application can be made longer than the conventionally used horizontal articulated type or vertical articulated type arms, and at the same time, can bear a larger loading capacity. Further, the long arm according to the invention of the present application can control the arm top end, i.e., can control a length and a rotation of the arm top end, even without using an electronic part at a position forming an articulate of the arm. Therefore, the long arm according to the invention of the present application is suitable for the use under severe environments where controlling of electric system is supposed to be difficult (i.e., is suitable for the use under the environments such as high temperature, high-dose radiation, strong electric field, and strong magnetic field in, for example, a thermal power plant and a nuclear power plant, under the environment requiring performance for explosion proof in, for example, plant facilities for oil/gas, and upon inspection of an inside of an aircraft fuel tank). Still further, the long arm according to the invention of the present application is also suitable for the use in checking bridges because a length of the arm is readily changed owing to the structure of the rods and the structure of the upright columns which connect the wires with the rods and the upright columns.

DESCRIPTION OF EMBODIMENTS

Figure 1:
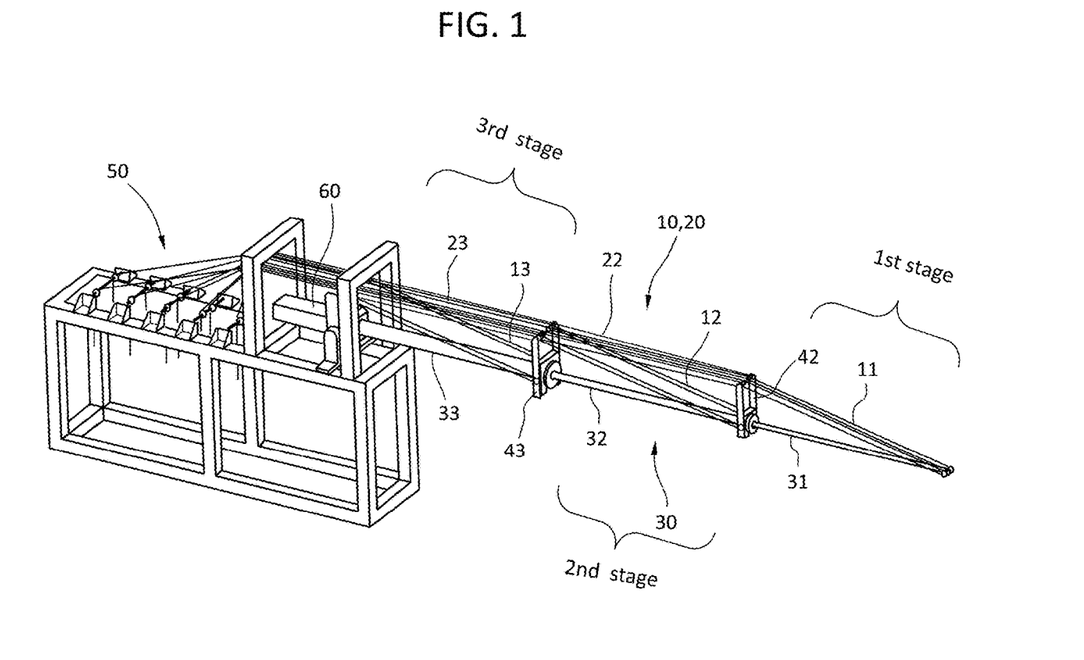
FIG. 1 shows a whole structure of a long arm according to the invention of the present application.

FIG. 1 shows a whole structure of an embodiment of a long arm according to the invention of the present application. The long arm according to the invention of the present application is supported in a cantilever manner under gravity.

The long arm includes first wires 11, 12, 13, second wires 22, 23, rods 31, 32, 33, upright columns 42, 43, tension generation means 50, and air pressure generation means 60. Here, in the present specification, there are cases where the wires 11, 12, 13 are inclusively referred to as wire 10, and the wires 22, 23 are inclusively referred to as wire 20 for facilitating the explanation.

The long arm according to the invention of the present application is formed by connecting the rods 31, 32, 33 in this order from the arm top end side. The rods 31, 32, 33 have cross section areas which decrease in a multistage manner from the arm terminal end side to the arm top end side. As a result, the rod 31 can be inserted into the rod 32 and is slidable within the rod 32, and the rod 32 can be inserted into the rod 33 and is slidable within the rod 33. In the present invention, this is referred to as "in a multistage telescopic manner". Further, in the present specification, there is a case where the rods 31, 32, 33 are inclusively referred to as rod 30.

In FIG. 1, an end of the rod 33 may be fixed to the air pressure generation means 60 which is configured to cause the rod 30 to be slidable. The air pressure generation means 60 is provided on a base structure on the arm terminal end side to supply gas into the rod 30 for the purpose of applying pressure inside the rod 30. Here, in the invention according to the present application, the fluid may be any one of a liquid, a fluent material, and a gas. In the long arm according to the invention of the present application, it is preferred to extend the rods by using compressed air.

The rod 30 has a hollow structure and an airtight property. To realize the airtight property, in the embodiment of the present invention, the rods 32, 33 each has a ring seal at its end.

The rod 30 may be made of any material. In view of a strength and lightness in weight, the rod 30 is preferably made of a carbon fiber reinforced plastic (CFRP).

The first wire 10 is stretched between a base section of the upright column on the arm top end side and the arm terminal end via a top section of the neighboring upright column on the arm terminal end side. For example, the wire 11 is fixed to a top end of the rod 31 and is stretched between the top end of the rod 31 and the corresponding arm terminal end via a pulley provided on a top section of the upright column 42. The wire 12 is suspended around a pulley provided on a base section of the upright column 42 and is stretched between the pulley of the base section of the upright column 42 and the corresponding arm terminal end via a pulley provided on the top section of the upright column 43. The wire 13 is suspended around a pulley provided on a base section of the upright column 43 and is stretched between the pulley of the base section of the upright column 43 and the corresponding arm terminal end via a pulley provided on a top section on the arm terminal end side. In the invention of the present application, if a pulley is provided also on the base section of the upright column on the arm top end side, if a wire is suspended around the top section of the neighboring upright column on the arm terminal end side, and if the wire is stretched between the base section of the upright column on the arm top end side and the corresponding arm terminal end via the pulley provided on the base section of the upright column on the arm top end side and the pulley provided on the top section of the upright column on the arm terminal end side, the wire tension can be increased only therebetween owing to the effect of movable pulleys. Such structure is preferable. The following structure is also preferred. Namely, a plurality of pulleys is provided on each of the base section of the upright column on the arm top end side and the top section of the neighboring upright column on the arm terminal end side, and wires are also stretched between the plurality of pulleys, thereby increasing the wire tension. At the time, the wires may be suspended whichever of the base section of the upright column on the arm top end side or the top section of the neighboring upright column on the arm terminal end side.

The second wire 20 is stretched between the top section of the upright column on the arm top end side and the arm terminal end via the top section of the neighboring upright column on the arm terminal end side. For example, the wire 22 is suspended around the top section of the upright column 42 and is stretched between the top section of the upright column 42 and the corresponding arm terminal end via the pulley provided on the top section of the upright column 43. The wire 23 is suspended around the top section of the upright column 43 and is stretched between the top section of the upright column 43 and the corresponding arm terminal end. If a pulley is provided also on the top section of the upright column on the arm top end side, if a wire is suspended around the top section of the neighboring upright column on the arm terminal end side, and if the wire is stretched between the top section of the upright column on the arm top end side and the corresponding arm terminal end via the pulley provided on the top section of the upright column on the arm top end side and the pulley provided on the base section of the upright column on the arm top end side, wire tension can be increased only therebetween owing to the effect of the moving pulley. Such structure is preferable. The following structure is also preferred. A plurality of pulleys is provided on each of the top section of the upright column on the arm top end side and the top section of the neighboring upright column on the arm terminal end side, and a wire is stretched between also the plurality of pulleys to increase the wire tension more. At the time, the wire may be suspended around whichever of the top section of the upright column on the arm top end side or the top section of the neighboring upright column on the arm terminal end side.

The tension generation means 50 is provided on the base structure on the arm terminal end side to hold ends of the wires 11, 12, 13 and the wires 22, 23 and to pull the wires, thereby applying the tension to each wire. More specifically, the most suitable tension is applied by a motor which serves to pull the wires 11, 12, 13 and the wires 22, 23.

The most suitable tension and the most suitable lengths of the wires 11, 12, 13 and the wires 22, 23 can be calculated based on the principle of the present application (will be described below) with ease. Further, a control may be performed at the same time by providing various types of sensors or a camera for monitoring a rod position.

Figure 2:
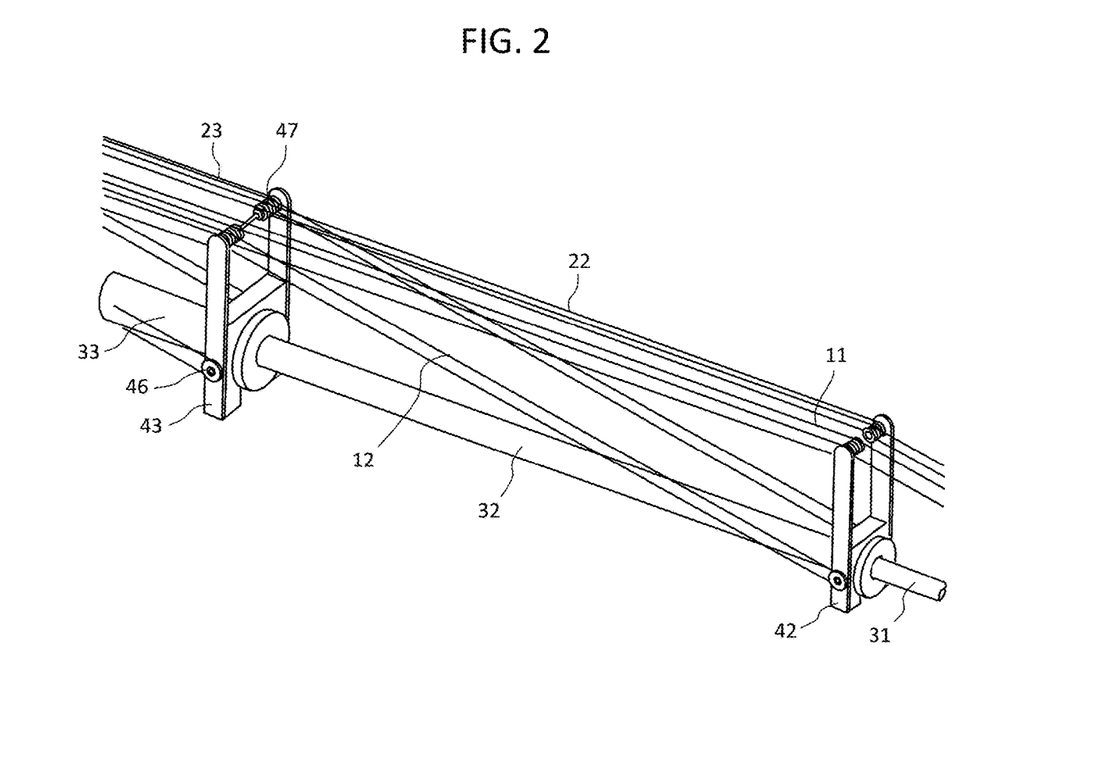
FIG. 2 shows a structure of rod connection parts of the long arm according to the invention of the present application.

FIG. 2 shows a structure of rod connection parts of the long arm according to the invention of the present application.

The upright column 42 is composed of a right upright column and a left upright column standing from the top end of the rod 32. The upright column 43 is composed of a right upright column and a left upright column standing from the op end of the rod 33. A pulley 46 is provided on the base section of the upright column 43. A pulley 47 is provided on the top section of the upright column 43. Similarly, the upright column 42 may also include pulleys on the base section and the top section thereof. The two upright columns, i.e., the right upright column and the left upright column, are connected by a frame beam. Then, the frame beam serves as a suspension end where ends of the parallelly stretched wires over the arm and ends of the obliquely stretched wires are suspended. Further, the frame beam functions as also a guide of the wires stretched from the arm top end side to the frame beam itself. An embodiment illustrated in FIG. 2 employs pulleys. Here, it is not essential to use pulleys at positions where the wires, which are stretched linearly along the arm of a straight shape, pass through the frame beam. Instead of the pulleys, it is sufficient to provide positioning devices having simple holes, the positioning devices being mounted to the frame beam.

Figure 3:
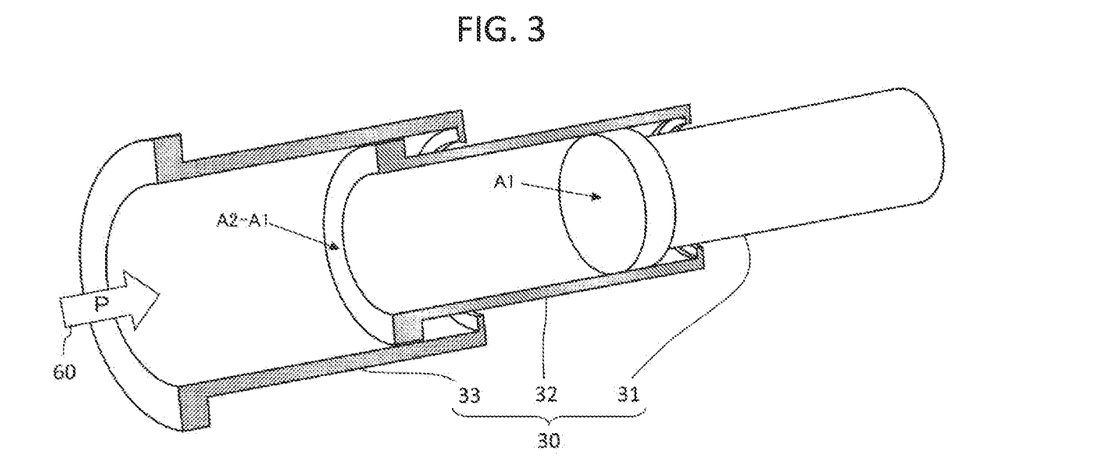
FIG. 3 shows a sliding state of the rods of the long arm, when the inside of the rods is applied with air pressure, according to the invention of the present application.

FIG. 3 illustrates an image of air pressure applied to the inside of the rods. The air pressure generation means 60 generates pressure P that acts on the inside of the rod 30. The rod 31 has an area $A_1$ of its terminal end face. The terminal end face of the rod 31 is locked by a locking surface at the top end of the rod 32. The rod 32 has an area $A_2-A_1$ of its terminal end face. The terminal end face of the rod 32 is locked by a locking surface at the top end of the rod 33. It is more preferred if there is provided a controlling mechanism (e.g., meshing mechanism with splines or key grooves) for controlling a dislocation of the rods in a rotation direction, as required.

Figure 4:
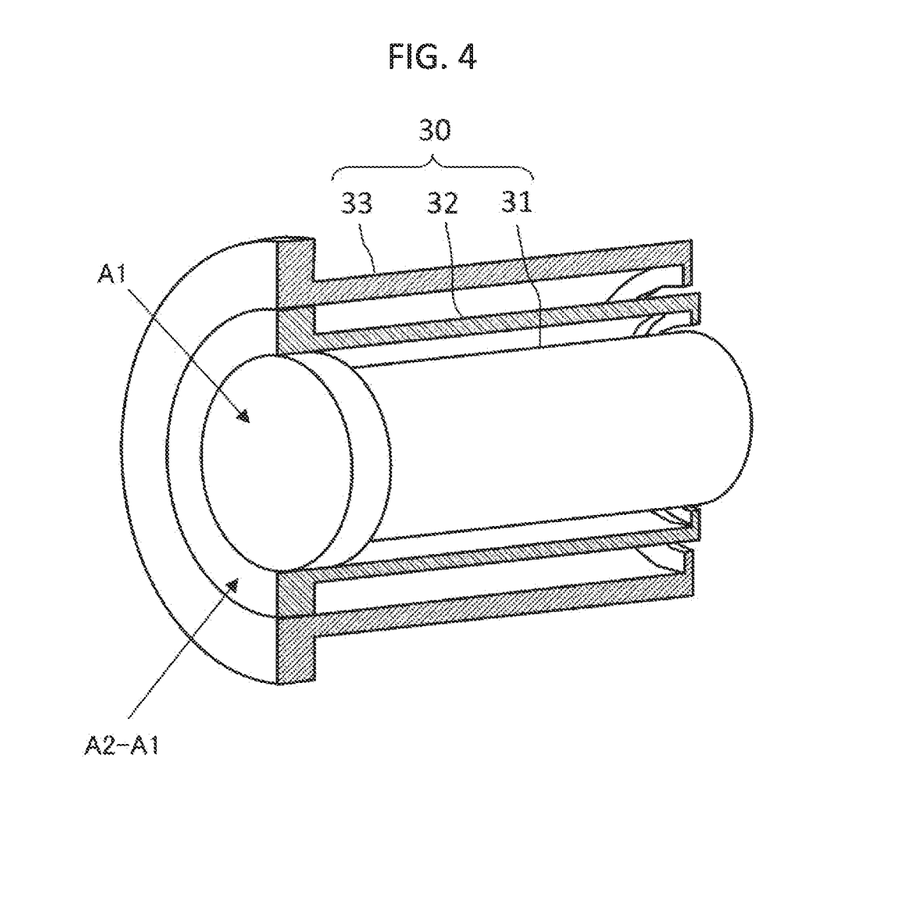
FIG. 4 shows a retraction state of the rods of the long arm according to the invention of the present application.

The rods are extendable/retractable. FIG. 4 illustrates an image of a retraction state of the rods. The rod 31 can be inserted into the rod 32. The rod 32 can be inserted into the rod 33. Namely, the rod 30 has a retractable structure.

The rod 30 in the retraction state is caused to be extended by the air pressure generation means 60. The rod 31 projects out from the rod 32, the rod 32 projects out from the rod 33, and the rod 33 projects out from the base structure. In the invention of the present application, the air pressure generation means 60 may be any conventionally used means.

The rods according to the invention of the present application, as shown in FIG. 3 and FIG. 4, have diameters, each being smaller as it goes to the rod on the arm top end side. In other words, from a truss structure on the arm top end side to a truss structure on the arm base end side, a compression force that the rod at the bottom of each truss structure should support increases. By increasing the cross section area of each rod in accordance with the increase of the compression force, a balance can be made, at anywhere on the arm, between the compression force acting on each rod having a different diameter and the extending/retracting force generated by the air pressure. With the structure, an axial force to be applied to each rod can be realized with the minimum essential weight. This is the feature of the long arm according to the invention of the present application.

The principle of the invention of the present application will be described below with reference to a simple model.

Figure 5:
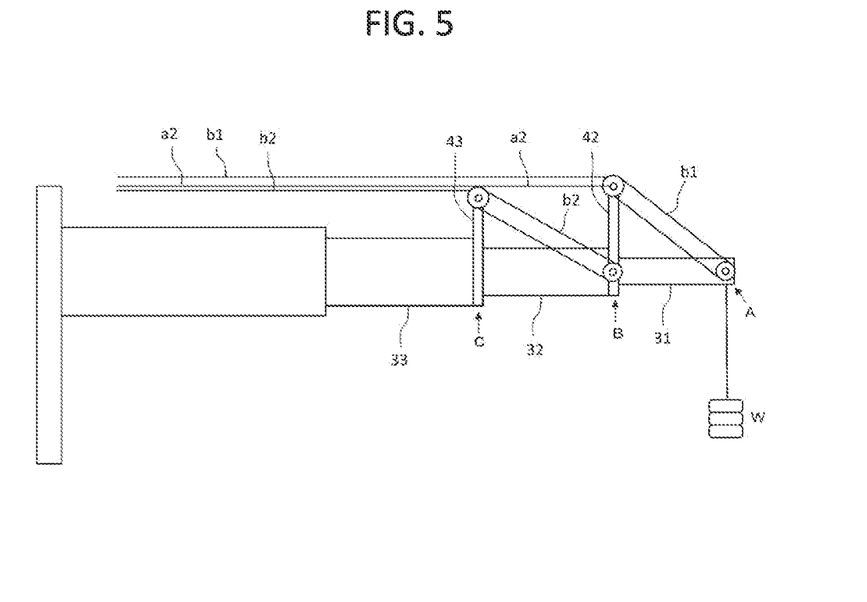
FIG. 5 shows a structure of a simplified model of the long arm according to the invention of the present application.

FIG. 5 shows a structure of the simplified model. To facilitate the explanation, FIG. 5 shows a portion of the long arm of FIG. 1. The simplified model is composed of three parts, i.e., the first rod to the third rod. A first rod top end is referred to as point A, a second rod top end is referred to as point B, and a third rod top end is referred to as point C. The point B and the point C are provided with the upright columns 42, 43, respectively, standing therefrom. In the simplified model, because the point A receives only a load but no moment, no upright column is provided at the point A. In a case where the point A receives a load which causes a moment to act on the point A, it is necessary to provide a corresponding upright column at the point A and to stretch a wire to the top section of the upright column, thereby supporting the upright column.

A wire b1 is stretched between the point A and the top section of the upright column at the point B, and the wire b1 is further stretched to the corresponding arm terminal end. Between the top section of the upright column at the point B and the top section of the upright column at the point C, a wire a2 is stretched, and the wire a2 is further stretched to the corresponding arm terminal end. Further, between the point B and the top section of the upright column at the point C, a wire b2 is stretched, and the wire b2 is further stretched to the corresponding arm terminal end.

Figure 6:
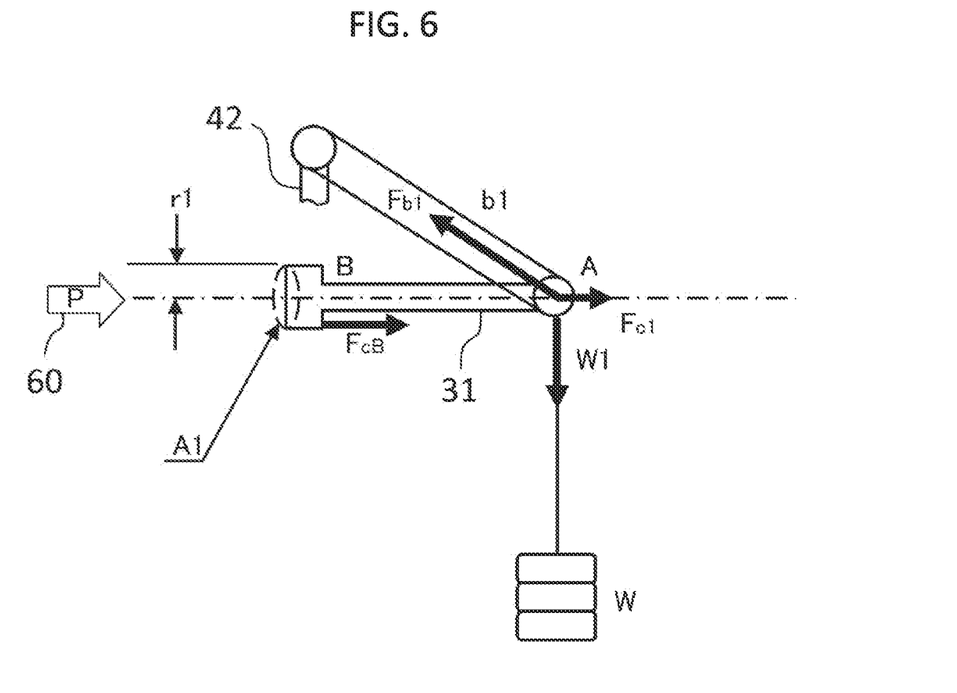
FIG. 6 shows a balancing state at a first link of the long arm according to the invention of the present application.

Referring to FIG. 6, a force balance at the first link composed of the first rod (rod 31) and the wire b1 will be described below.

Firstly, $F_{b1}$ is decided based on a balancing condition in a vertical direction at the point A.

Nextly, $F_{c1}$ is decided based on a balancing condition in a horizontal direction at the point A.

Then, an air pressure P is decided based on the following conditional expression in which the extension force by the air pressure and the Fri balance. Here, an internal radius $r_1$ of the first rod may be given any proper value considering the intended use of the rod.

$$F_{c1} = PA_1 = P\pi r_1^2$$

Figure 7:
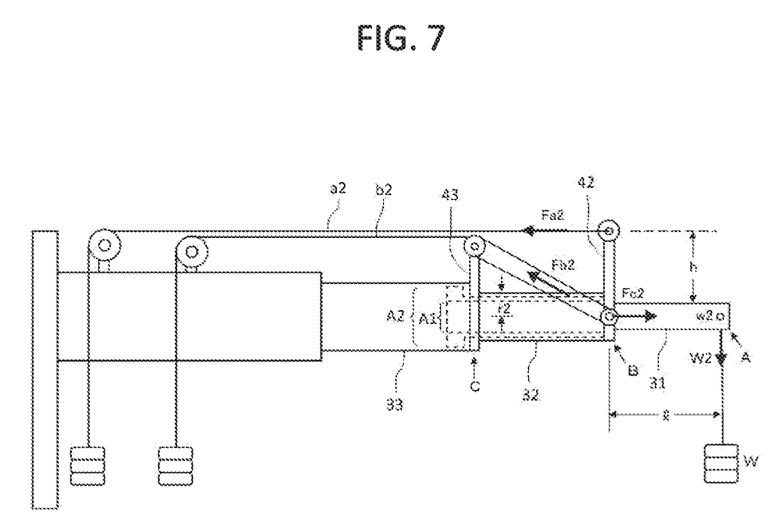
FIG. 7 shows a balancing state at a second link of the long arm according to the invention of the present application.

Referring to FIG. 7, a force balance and a moment balance at the second link composed of the second rod (rod 32), the wire b2, and the upright column at the point B will be described below.

In FIG. 7, the point A receives weight $w_2$ of the first rod. $F_{a2}$ is decided based on the moment balance, i.e., $w_2 l = F_{a2} h$, around the point B. The calculation of $F_{a2}$ in this manner means that the arm position can be kept even when a support moment is zero at the upright column at the point B.

Nextly, $F_{b2}$ is decided based on a balancing condition in a vertical direction at the point B.

Nextly, $F_{c2}$ is decided based on a balancing condition in a horizontal direction at the point B.

Then, based on a condition, i.e., $F_{c2} = PA_2 = P\pi r_2^2$, for generating a desired extension force by the above acquired air pressure P, a cross section area $A_2$ and a radius $r_2$ of the internal diameter of the rod are decided.

Here, the area of the end surface of the second rod on the arm terminal end side is acquired by $A_2 - A_1$. The air pressure pushing the end surface of the first rod on the arm terminal end side acts on also the end surface of the second rod on the arm terminal end side. Namely, the air pressure of $P(A_2 - A_1) + PA_1 = PA_2$ acts thereon. The inventor named this phenomenon a coupled drive of air pressure.

In the cantilevered beam, a moment becomes larger from the top end to the terminal end of the beam. Further, in a case where the arm is formed in a multistage manner, the cross section becomes larger and the self-weight increases from the top end to the terminal end. This structure generates larger moment. As a result, the axial force becomes larger from the top end to the terminal end in accordance with the increasing moment.

To the contrary, in the coupled drive of the air pressure, pressure of the supplied compressed air does not change. But, because the cross section area becomes larger, a larger extension force by the air pressure is applied as it goes from the top end to the terminal end. As a result, by deriving an appropriate value of the cross section area of each rod according to the above-described calculation process, the extension force by air pressure which should be applied to each rod can be generated with the minimum required self-weight, resulting in opposing the moment.

Figure 8:
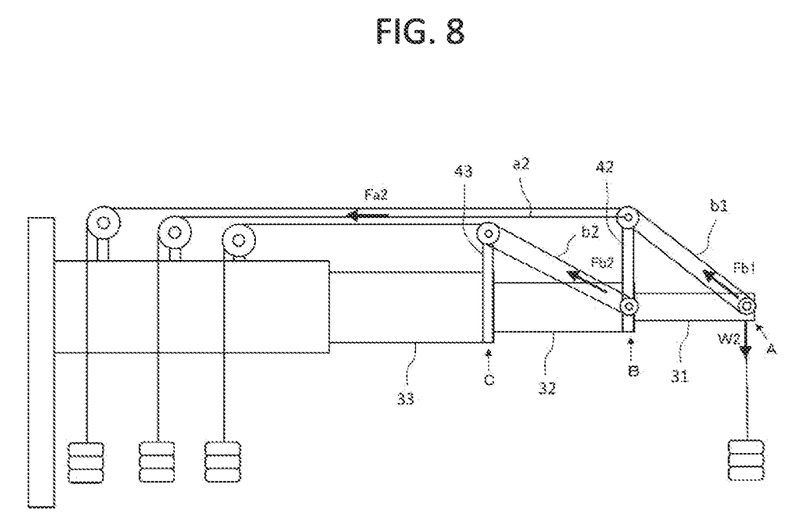
FIG. 8 shows a wire traction force of the long arm according to the invention of the present application.

Referring to FIG. 8, tension applied to the wires will be described below.

The wire b1 receives tension $F_{b1}$. Here, in a case where the wire b1 is stretched in double between the point A and the top section of the upright column at the point B, the tension applied to each wire between the top section of the upright column at the point B and the corresponding arm terminal end is $F_{b1}/2$ based on the principle of the running pulley. Further, because the wire b1 is composed of two wires, i.e., a left wire and a right wire, the tension applied to each wire is $F_{b1}/4$.

The wire b2 receives tension $F_{b2}$. Further, the wire b2 is composed of two wires, i.e., a left wire and a right wire, and each wire receives tension of $F_{b2}/2$ (see, FIG. 8). Because the wire b2 is stretched in double between the point B and the top section of the upright column at the point C, based on the principle of the running pulley, each wire receives tension of $F_{b2}/4$ between the top section of the upright column at the point C and the corresponding arm terminal end (not shown).

In FIG. 8, it looks that the wire a2 receives tension $F_{a2}$. Actually, however, the wire b1 also partially receives the tension that is applied therebetween. Therefore, the wire a2 receives less tension than the tension $F_{a2}$ which is actually applied to the wire a2. The inventor named this phenomenon a coupled drive of the wires.

As described above, the long arm can be realized with a relatively small wire traction force and a relatively small air pressure. Further, because the rods used here are hollow, light weight can be achieved.

In the long arm of the invention of the present application, the wire over the rod receives only a tensile force, and the rod beneath the wire receives only a compression force. Therefore, a moment applied to the base section of the upright column is zero. As described above, the upright column is provided on the top end of each rod of the air pressure-extending type telescopic rod to which compressed air is supplied, and wires are stretched between the upright columns to support the long arm by using the traction force of the wires which supports a shearing force and a bending moment as well as to cause the rod to extend/retract. It becomes clear that an introduction of such truss structure enables designing of a practical arm satisfying the above-described specification. The inventor named this cantilever arm of the present application a truss arm.

Here, the truss structure is a structure formed by connecting triangle-shaped structures and has such a feature that each joint receives only a tensile force and a compression force, but no bending moment occurs in each member. Therefore, the truss structure is advantageous in constructing a large structure. In the standard truss structure, an X-shaped frame in which obliquely paired corners of the four corners of a square frame are connected is mounted. On the other hand, the long arm of the invention of the present application is an arm which is caused to extend in a horizontal direction in a cantilever manner and has such an operation condition that only a downward load is constantly applied to the arm top end. Therefore, the present invention employs a telescopic rod which is extendable by air pressure as a downward structure which receives only a compressive stress, the left and right upright columns are provided on the ends of all the rods having different diameters of the telescopic rod, and a wire is stretched between the paired obliquely-crossing corners of the X-shaped frame where a traction force is generated. Namely, the invention of the present application employs a truss structure which is different from the conventional truss structure.

In the meantime, in the present application, where the rods are made hollow to receive air pressure inside thereof, the air pressure contributes to generation of forces in an axis direction and in a radial direction of the rods. The pressure in the radial direction which attempts to inflate the diameters of the rods is supported by a strength of the members of the rods. As a result, the axial force is applied to only the rods extendable in the axis direction and supports the compression force applied from the outside. With the structure, because the compression force is not applied to the members of the rods themselves, such an effect that buckling unavoidable for the long arm does not occur is produced.

Figure 9:
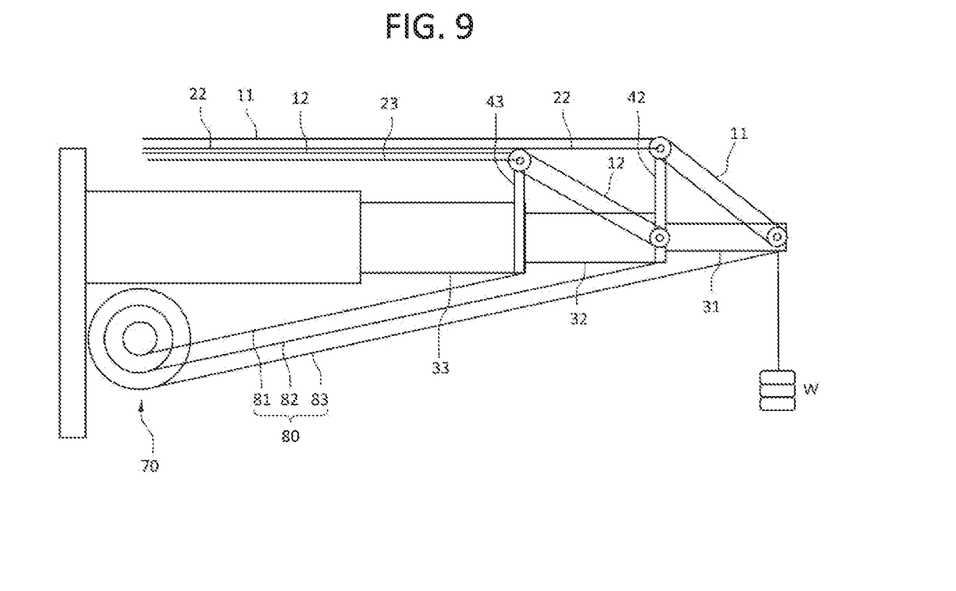
FIG. 9 shows an image of a take-up speed adjustment of the long arm according to the invention of the present application.

FIG. 9 shows an example how to control the take-up speed. The long arm has feed and take-up speed controlling means 70 on the arm terminal end side. The feed and take-up speed controlling means 70 is, for example, a controlling pulley. The controlling pulley 70 is provided with a third wire 80 wound therearound. The third wire 80 is composed of wires 81, 82, 83. An end of the wire 81 is fixed to the rod 31, an end of the wire 82 is fixed to the rod 32, and an end of the wire 83 is fixed to the rod 33.

Where the rod 30 is extended by the air pressure, any rod which extends faster than other rods is restricted by the feed and take-up speed controlling means 70, and thus the rod 31, the rod 32, and the rod 33 extend at the same rate.

As described in the above principle, the invention of the present application is characterized in that the coupled drive of the wires and the coupled drive of the air pressure are linked together while keeping the balance therebetween.

A control of the extending speed contributes to the adjustment of the wire traction force and the wire length to appropriate values while the rod is extending.

The present invention is not limited to the above-described embodiments, but various modifications thereof may be also embraced within the scope of the present invention. For example, the number of rods, wires, and upright columns may be any number.

Figure 10:
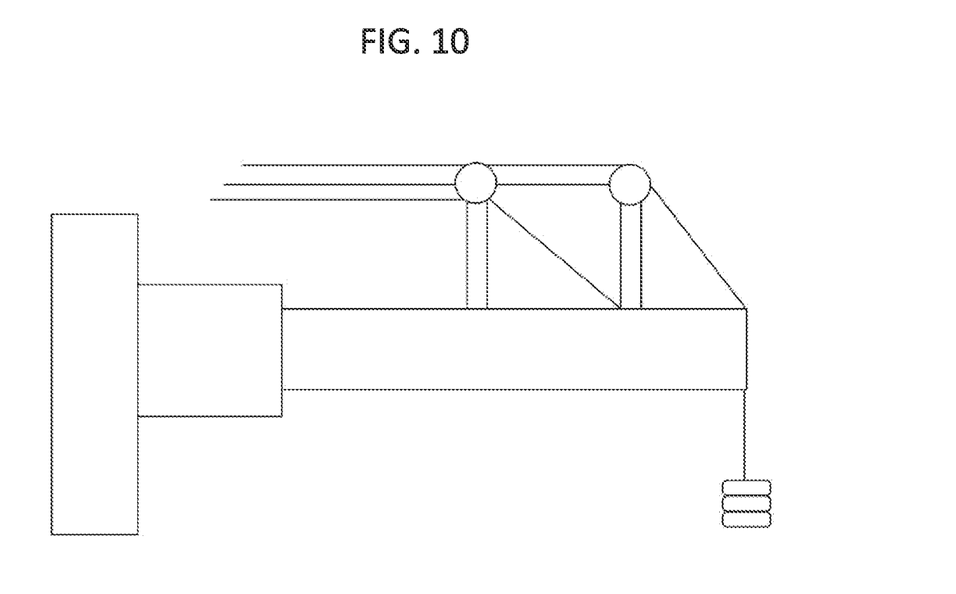
FIG. 10 shows a First Modification Example of the long arm according to the invention of the present application.

FIG. 10 shows a schematic structure of the long arm according to an example (First Modification Example) of the modification examples of the invention of the present application. The cross section of the rod is constant. It is also possible to employ, according to the situation, the rod of which cross section area decreases from the arm terminal end side to the arm top end side. If the rod is hollow and the compressed air is applied to the inside thereof, an extension force is applied by the air pressure. Such structure is preferred. Even in a case where the rod is not hollow, if the wires are stretched by using, for example, the pulleys, between the upright columns which are provided at regular intervals, the rod does not receive the bending stress but receive only the compressive stress, and thus such a structure in which the wires can generate the extension force to be applied to the arm top end of the long arm can be made. This enhances a position keeping characteristic of the long arm having a cantilever structure. Further, such a structure that the wires are pulled by each corresponding arm terminal ends can produce a coupled drive effect of the wires. This is the most basic model of the invention of the present application.

Figure 11:
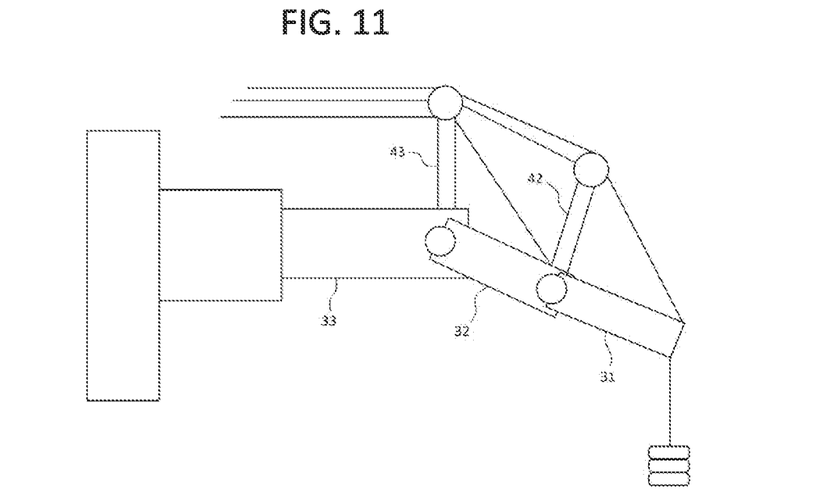
FIG. 11 shows a Second Modification Example of the long arm according to the invention of the present application.

FIG. 11 shows a schematic structure of the long arm according to a Second Modification Example of the invention of the present application. In the above-described embodiment, it is provided that the moment applied to the base section of the upright column is zero. Therefore, the rod 31, the rod 32, and the upright column 42 or the rod 32, the rod 33, and the upright column 43, respectively, may be coupled to each other about the same axis in a rotatable manner.

In FIG. 11, the rod 31, the rod 32, etc., may be formed into a telescopic rod which extends by air pressure. In this case, the air pressure can bear a contractive force which the rods receive, and thus structural materials of the rods do not receive a load of contraction, resulting in no occurrence of buckling.

The rod position can be controlled by adjusting lengths of the wires while controlling the tension of the wires. For example, as shown in FIG. 11, it is possible to make an angle to the rods.

Figure 12:
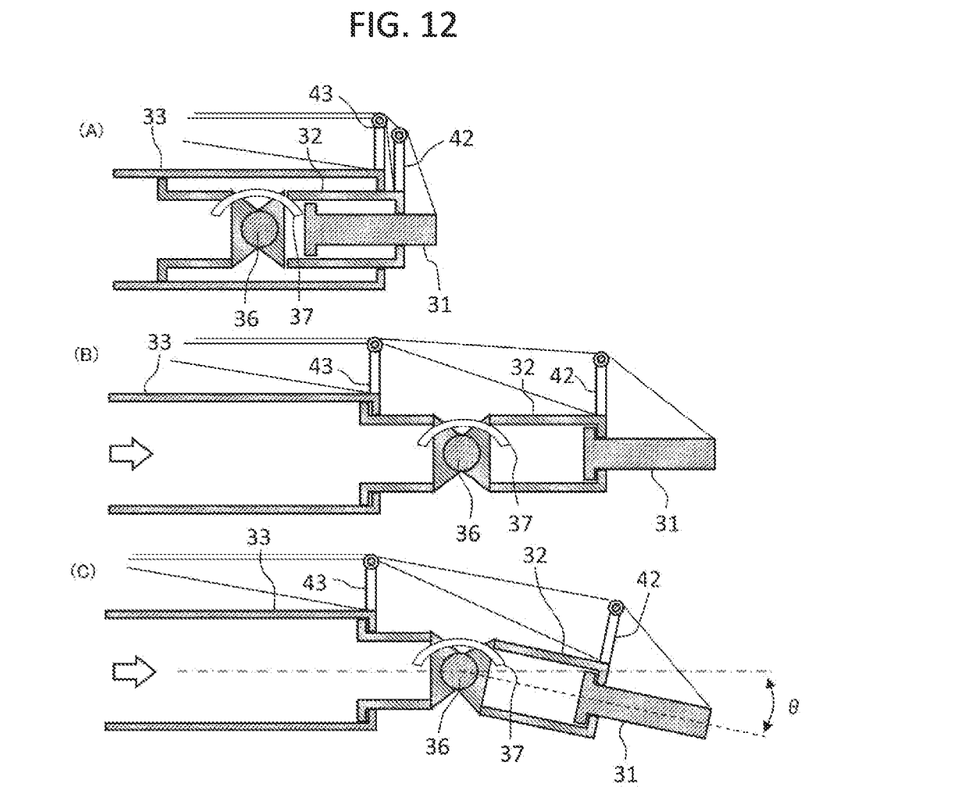
FIG. 12 shows a Third Modification Example of the long arm according to the invention of the present application.

FIG. 12 shows a schematic structure of a long arm according to a Third Modification Example. The Third Modification Example has characteristics of the above-described embodiment and the Second Modification Example.

FIG. 12(A) shows a retraction state. That is, the rod 31 is inserted into the rod 32, and the rod 32 is inserted into the rod 33. The rod 32 includes a rotation shaft 36 and an air pressure transmitter 37 at somewhere in the rod 32.

FIG. 12(B) shows an extending state. The air pressure transmitter 37 causes the rod 32 to receive pressure inside thereof. The rod 31 projects out from the rod 32, and the rod 32 projects out from the rod 33.

FIG. 12(C) shows a bended state. That is, by controlling the lengths of the wires while keeping the tension control of the wires, the rod position can be controlled via the rotation shaft 36.

Figure 13:
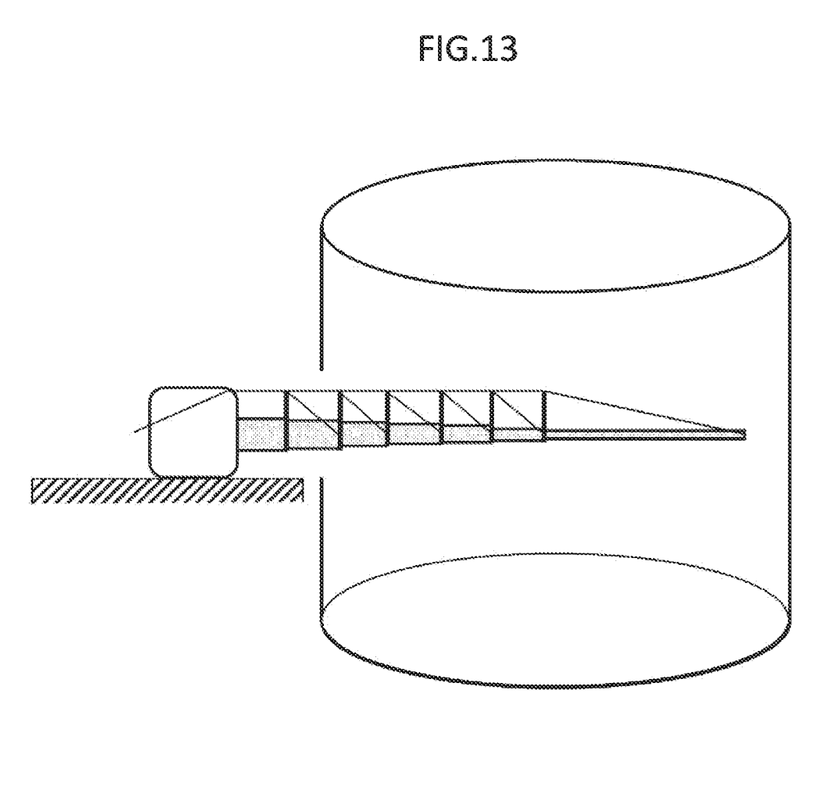
FIG. 13 shows an Application Example of the long arm according to the invention of the present application.

Referring to FIG. 13, application of the long arm according to the invention of the present application will be described below. The long arm of the invention of the present application is suitable for the use of a remote control under severe conditions because it has the above-described structure. More specifically, FIG. 13 simply illustrates a case where an accident occurred within a tank of an industrial complex and where a person cannot easily approach, and thus cannot operate a precision apparatus. Even under such severe environment, the long arm of the present invention is physically operable. This is possible because the long arm of the invention of the present application includes the telescopic shaped rods and the wires and the upright columns capable of causing the rod slidable and operable, and thus only the arm is exposed to the severe condition, but the air pressure generation means and the tension generation means requiring electrical system can be set up at a place away from the severe environment.

Further, the long arm according to the invention of the present application can keep the tension by means of, for example, a selection of materials for the hollow rods and the wires. This can realize the lightness in weight.

In the invention of the present application, it is also possible to make a balance between the tension of the wires and the weight of the rods. This makes it possible to appropriately design a diameter and a length in such a manner that the arm does not contact an introducing location and obstacles inside the industrial complex.

In the invention of the present application, when inconvenience, e.g., twisting of the arm, occurs in the arm, the inconvenience can be fixed by adjusting each respective wire (especially, by adjusting the balance between a right wire and a left wire). With the structure, the arm position can be kept.

REFERENCE CHARACTER LIST 10, 11, 12, 13 first wire
20, 22, 23 second wire
30, 31, 32, 33 rod
36 rotation shaft
37 air pressure transmitter
40, 42, 43 upright column
46, 47 pulley
50 tension generation means
60 air pressure generation means
70 take-up speed controlling means
80, 81, 82, 83 third wire

The invention claimed is:

1. A long arm, including an arm top end side and an arm terminal end side, which is supported in a cantilever manner under gravity, the arm comprising:
   rods (30, 31, 32, 33) for forming a long arm body;
   a plurality of upright columns (40, 42, 43) standing from the rods, each of upright columns including a top section and a bottom section;
   first wires (10, 11, 12, 13) stretched between a base section of an N−1th upright column from the arm top end side and corresponding arm terminal ends via a top section of a Nth upright column;
   second wires (20, 22, 23) stretched between a top section of the N−1th upright column from the arm top end side and corresponding arm terminal ends the arm via the top section of the Nth upright column; and
   tension generation means (50) on the arm terminal end side for applying independent tension to the first wires and the second wires each on corresponding arm terminal ends.

2. The long arm according to claim 1, wherein the rods have cross section areas which decrease from the arm terminal end side to the arm top end side.

3. The long arm according to claim 1,
   wherein cross section areas of the rods decrease in a multistage manner from the arm terminal end side to the arm top end side; and
   wherein the plurality of upright columns is provided on stages of the rods.

4. The long arm according to claim 1, wherein the rods are airtight and configured to receive a fluid pressure of a fluid supplied to an inside thereof.

5. The long arm according to claim 4,
   wherein the rods are formed in a multistage telescopic manner such that the rods reduce their diameters from the arm terminal end side to the arm top end side;
   wherein the rods which are formed in a multistage telescopic manner are extendable by the fluid pressure; and
   wherein the plurality of upright columns is provided on the stages of the rods.

6. The long arm according to claim 5, wherein a tension generation means is configured to adjust tension of the first wires and the second wires in accordance with an extension of the rods.

7. The long arm according to claim 5, wherein the tension generation means is configured to adjust lengths of the first wires and the second wires in accordance with an extension of the rods.

8. The long arm according to claim 5, further comprising third wires for controlling a feed and take-up speed, the third wires being stretched between the rods formed in a multistage telescopic manner and the corresponding arm terminal ends.

9. The long arm according to claim 8, wherein the third wires are provided to the stages of the rods in each corresponding manner.

* * * * *